United States Patent

Sauter et al.

[11] Patent Number: 5,636,792

[45] Date of Patent: Jun. 10, 1997

[54] DYE MARKER FOR AGRICULTURAL ROW GUIDANCE

[75] Inventors: Gerald F. Sauter, Eagan; George F. Nelson, Coon Rapids; David P. Andersen, Burnsville; Dennis W. Paulinski, Plymouth, all of Minn.

[73] Assignee: Lockheed Martin Corporation, Bethesda, Md.

[21] Appl. No.: 386,016

[22] Filed: Feb. 9, 1995

[51] Int. Cl.$^6$ .................................... A01G 25/09
[52] U.S. Cl. .................................... 239/172
[58] Field of Search ................... 239/172, 150, 239/146; 180/167, 168, 169

[56] References Cited

U.S. PATENT DOCUMENTS

| | | | |
|---|---|---|---|
| 2,074,251 | 3/1937 | Braun | 180/169 |
| 3,584,288 | 6/1971 | Lloyd | 239/172 |
| 3,628,624 | 12/1971 | Wesener | 180/168 |
| 3,935,922 | 2/1976 | Cooper et al. | |
| 4,227,649 | 10/1980 | Poffearoth | |
| 4,307,791 | 12/1981 | Bruine | 180/168 |
| 4,365,672 | 12/1982 | Robinson, Jr. et al. | 172/130 X |
| 4,555,725 | 11/1985 | Feiersbach et al. | 358/93 |
| 4,706,773 | 11/1987 | Reinaud | 180/169 |
| 4,746,977 | 5/1988 | White | 180/168 X |
| 4,800,962 | 1/1989 | Murray | 172/130 X |
| 4,942,531 | 7/1990 | Hainsworth et al. | |
| 5,066,854 | 11/1991 | Meyer et al. | |
| 5,111,401 | 5/1992 | Everett, Jr. et al. | |
| 5,299,971 | 4/1994 | Hart | |
| 5,318,143 | 6/1994 | Parker et al. | 180/168 |
| 5,427,195 | 6/1995 | Paul et al. | 180/242 X |

FOREIGN PATENT DOCUMENTS 382647  8/1990  European Pat. Off. ............ 239/172

Primary Examiner—Robert J. Oberleitner
Assistant Examiner—C. T. Bartz
Attorney, Agent, or Firm—Carl L. Johnson

[57] ABSTRACT

A method and apparatus for guiding an agricultural implement having transversely extending arms by spraying the ground with a band of a fluorescent chemical from an end of one of the extending arms of the agricultural implement to mark the end of the area covered by a first pass of the agricultural implement, directing an optical beam having a width substantially greater than the band of fluorescent chemical onto the band of fluorescent chemical to fluoresce a portion of the band of fluorescent chemical which produces a fluoresced region on the band of fluorescent chemical, and positioning a detector on the band of fluorescent chemicals to detect the fluoresced region on the band of fluorescent chemical to determine the position of the implement with respect to the fluoresced region and thereby maintain the implement on course.

5 Claims, 3 Drawing Sheets

DYE MARKER FOR AGRICULTURAL ROW GUIDANCE

FIELD OF THE INVENTION

This invention relates to a guidance and marking system for agricultural equipment. more particularly, to a system for marking a field with a fluorescent chemical on a first pass and then fluorescing the chemical on a second pass to provide information on maintaining the proper course of the agricultural equipment.

BACKGROUND OF THE INVENTION

The concept of marking systems for a wide agricultural implements is well known in the art. Typically, during a first pass of the implement, some type of mark is applied to the field either mechanically or chemically to provide a reference mark for the operator to follow on a return pass. The reference mark enables the operator to maintain each pass of the vehicle in the proper position to minimize overlapping or underlapping of the path followed by the implement during a return pass; however, in some applications, visual field markings are inadequate. For example, if the operator is applying chemicals or herbicides to the field on a boom arm extending 60 feet from each side of the tractor, it is difficult for him or her to visually determine exactly where the edge of the previous pass ends with respect to the end of the boom arm which is located lateral to him or her.

Overlapping in applying agricultural chemicals wastes chemical, can harm crops. Underlapping can leave crop gaps in the field which reduces the yield of the crop. Accordingly, the present invention provides an inexpensive system for marking an implement path and remotely determining the position of the implement with respect to the markings on a subsequent pass of the implement.

BRIEF DESCRIPTION OF THE PRIOR ART

U.S. Pat. No. 3,584,788 describes a means of spraying spots of visible marker fluid onto the field for the operator to visually follow. The typical fluid is aluminum particles in diesel fuel. This is environmental contamination with petroleum hydrocarbons and not permitted.

U.S. Pat. No. 4,227,649 shows a mechanism to control the spray application of a dye-marker fluid.

U.S. Pat. No. 4,365,672 shows a mechanical mechanism which provides alternating right and left markers as the vehicle progresses through the field.

U.S. Pat. No. 4,555,725 shows a video camera raster scan imaging of the marker and a means to control the steering of the vehicle in response to the marker video image.

U.S. Pat. No. 4,800,962 describes alternating right and left marker arm sequencing control.

U.S. Pat. No. 5,111,401 shows a robotic control for free-roaming roamings. It refers to a system by Litton Corporation which tracks a chemical stripe that is illuminated by ultraviolet energy. It uses encoded information in the stripe for position information. This invention addresses a specific digital design for control.

U.S. Pat. No. 3,935,922 uses ultra-violet fluorescence for guidance of flexor maintenance equipment. This invention includes guidance electronics which are in analog form.

U.S. Pat. No. 4,307,791 shows a system for automatically guiding a vehicle using a fluorescent material placed upon the floor. It also uses code marking to indicate position information for automatic guiding.

U.S. Pat. No. 5,006,854 shows a system for sell:steering, driverless floor vehicles for use in buildings. It describes a guidance method which uses smoothly varying intensity from the optical guiding sensors to maintain more precise control of position than with presence or absence of optical signal.

U.S. Pat. No. 4,942,531 shows a self-adapting signal detector electronic design. It uses multiple optical detectors rather than a single detector.

U.S. Pat. No. 5,299,971 shows an interactive tracking device using infrared sensors to provide signals for activation of surveillance or other types of warning systems.

SUMMARY OF THE INVENTION

An implement for applying agricultural chemicals over an extended area and for guiding the implement to prevent excessive underlapping or overlapping of agricultural chemicals including an elongated boom for applying the agricultural chemicals proximate the boom, a nozzle for directing a band of fluorescent chemical onto a position represented by a path of one end of the implement, a light source for illuminating a portion of the fluorescent chemical band when the end of the implement is proximate the fluorescent chemical band; and a photodetector for determining the position of the illuminated portion of the fluorescent chemical band with respect to the end of the implement so that a corrective signal can be sent to bring the implement to a course which minimizes underlapping or overlapping between the respective parallel passes of the implement.

DESCRIPTION OF THE PREFERRED EMBODIMENT

Figure 1:
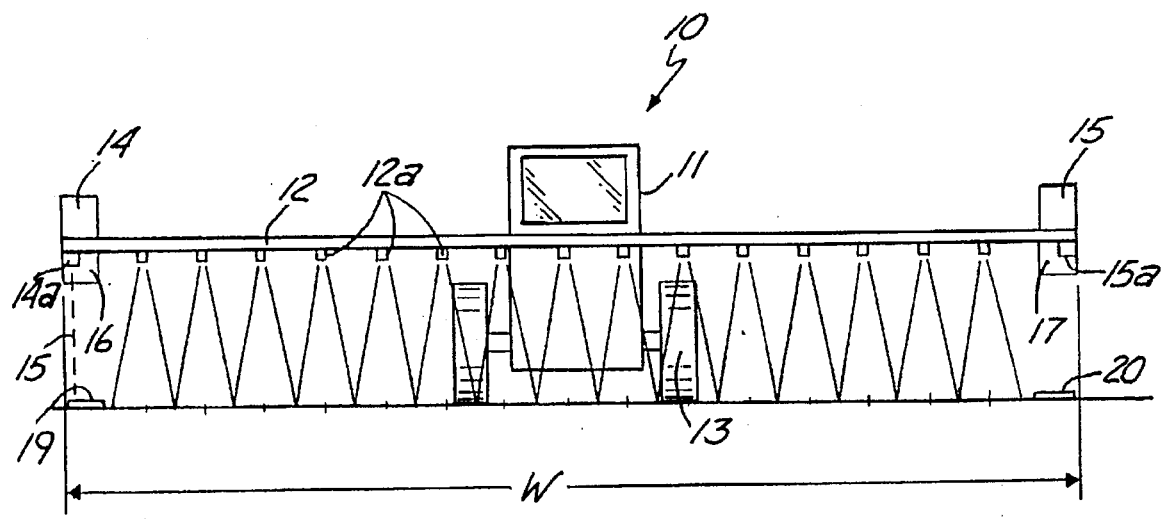
FIG. 1 shows a rear view of an implement applying chemicals to the field with a marker and a detecting system located on the ends of the boom of the implement.

FIG. 1 reference numeral 10 generally identifies a system for application of agricultural chemicals to a field. System 10 includes a tractor 11 and an implement 12 having boom arms extending laterally from tractor 11. Nozzles 12a located on implement 12 are shown spraying an agricultural chemical such as an herbicide, fertilizer or the like onto the field.

The width of the implement is identified by "w" and typically may be 120 feet or more. With implements of this length, overlapping and underlapping can be a problem. Overlapping occurs when the equipment sprays agricultural chemical on an area that was sprayed on a previous pass of the implement. Underlapping is the opposite and occurs when the equipment sprays agricultural chemical on the field which does not extend to the edge of the agricultural chemical sprayed on a previous pass. Overlapping in applying agricultural chemicals wastes chemical and can harm crops. Underlapping can leave crop gaps in the field which reduces the yield of the crop. The present invention provides an inexpensive system for marking an implement path and remotely determining the position of the implement with respect to the markings on a subsequent pass of the implement.

FIG. 1 shows a first band of fluorescent chemicals 19 located on the field proximate one end of implement 12 and, similarly, another band of fluorescent chemical 20 located proximate the opposite end of implement 12 with the band of fluorescent chemicals 20 having been applied by an earlier pass of implement 12. Located on one end of implement 12 is a dye marker nozzle 14a which sprays a fluorescent chemical 15 onto the field at a position commensurate with the path followed by the end of implement 12.

Generally, fluorescent chemical 15 is sprayed on the field to form a band 19 of fluorescent chemicals which can be 4–6 inches wide. Reference numeral 19 identifies the band of fluorescent chemical located proximate one end of implement 12, and reference numeral 20 identifies the band of chemicals applied during a previous pass. Band 20 is formed by a nozzle 15a that sprays a fluorescent chemical commensurate with the path followed by the right end of implement 12; however, since the operator usually makes a return pass parallel to the previous pass, it is necessary follow the band of fluorescent chemical 20 from a previous pass with one end of the implement while the other end of the implement applies a band of chemicals for monitoring on a subsequent pass. Because an operator can make numerous passes, each end of the implement includes nozzles for spraying fluorescent chemicals on the field but, in most instances, only one band is applied at a time.

While the band of fluorescent chemicals does not need to be positioned at the edge of the region sprayed by the agricultural chemicals, the present embodiment shows the fluorescent chemicals sprayed substantively coextensively with the edge of the agricultural chemicals.

Receivers and optical generators are on both ends of the implement but usually only one receiver is used at a time. That is, located on each end of implement 12 is a laser-light source 16 and a receiver 14, and located on the other end of implement 12 is a laser-light source 17 and a receiver 15.

Figure 2:
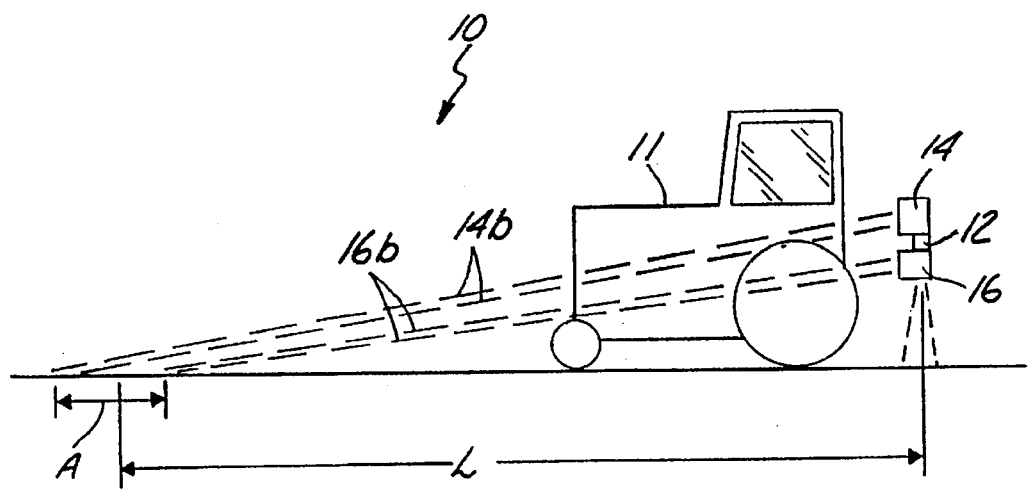
FIG. 2 shows a side view of the implement of FIG. 1.

FIG. 2 shows a side view of system 10 with the paths of light beams to and from the implement identified by dashed lines. Briefly, light source 16 emits a narrow band of light indicated by lines 16b. The light impinges on the field a distance ahead of the implement which is identified by the dimension "L". Typically, the dimension L may be on the order of 100 feet or more. The light beam is of a wavelength that excites the fluorescent chemical located in band 19 or 20.

Figure 3:
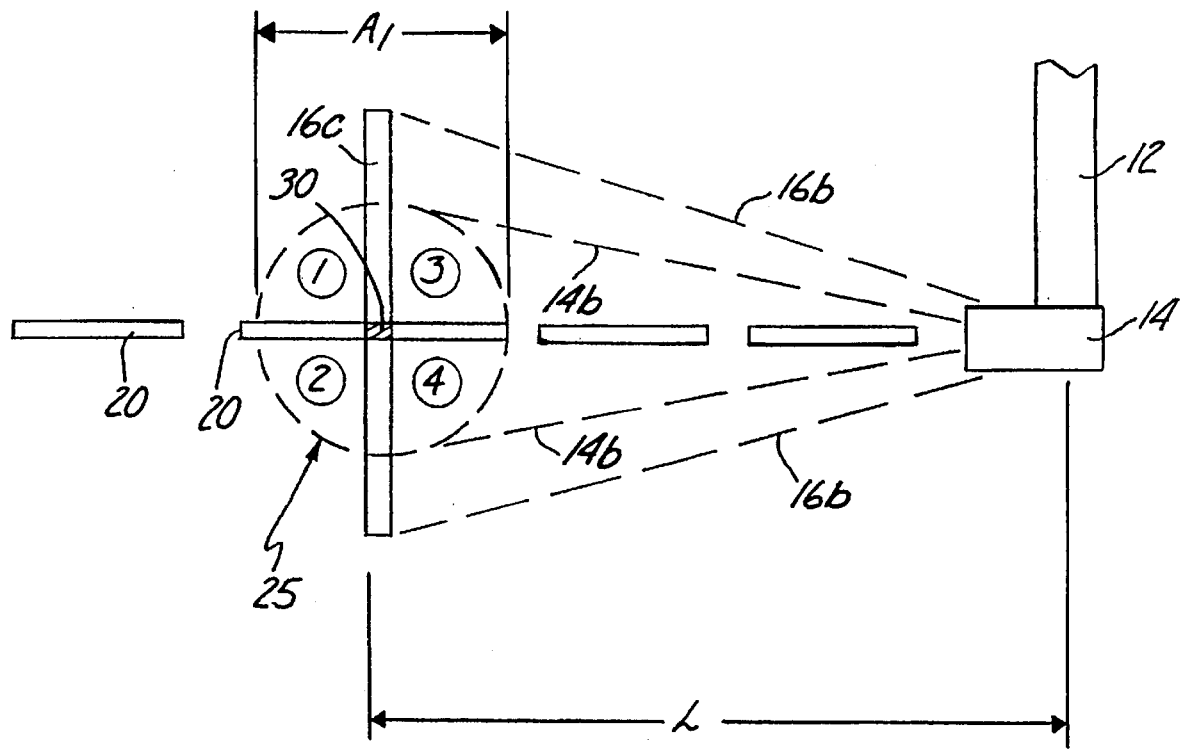
FIG. 3 shows a top view of the fluorescent band of chemicals with respect to the implement and the position-detecting equipment when the implement is on course.

FIG. 3 shows a partial top view of one end of implement 12 together with the images projected onto and received from the field. The band of fluorescent chemicals 20 extends along the field providing an indicator of where the edge of the agricultural chemicals are located from the previous pass of implement 12 ocurred. An interpreted band of chemicals is shown rather than a continuous band since the use of an interrupted band requires less fluorescent marking chemicals and consequently reduces the cost. The area covered by receiver 14 is identified by the designation $A_1$. The path of the returning signal from the fluoresced chemicals to receiver 14 is identified by dashed lines 14b. In the preferred embodiment receiver 14 is either an array of photodiodes or a four-quadrant array detector. The optical beam projected by light source 16 is shown as a narrow band 16c that extends laterally across band 20 of fluorescent chemicals to fluoresce a portion 30 of chemical band 20.

Reference numeral 25 identifies the area scanned by four quadrant array detector 14 with the four quadrants identified by numerals 1, 2, 3, and 4. Located as a band of light 16c is the image projected from light source 16. In the preferred embodiment a laser-light source is used to obtain the coherence of the light beam as it travels from the implement to the area in front of the implement. The laser light passes through a cylindrical lens which converts the point-like source of laser light to a band of light projected onto the field ahead of the implement. FIG. 3 shows band 16c extending across the band of fluorescent chemicals 20. The region in which light band 16c excites the band of fluorescent chemicals 20 also excites the fluorescent chemical creating an illuminated area 30 which can be detected by photodiode receiver 14 located on the end of implement 12.

FIG. 3 shows the excited region 30 of the fluorescent chemical located at the center of the region covered by the four-quadrant array detector 14. In this condition, implement 12 is on course with the band of fluorescent chemicals which does not require path correction of tractor 11 and implement 12.

Figure 4:
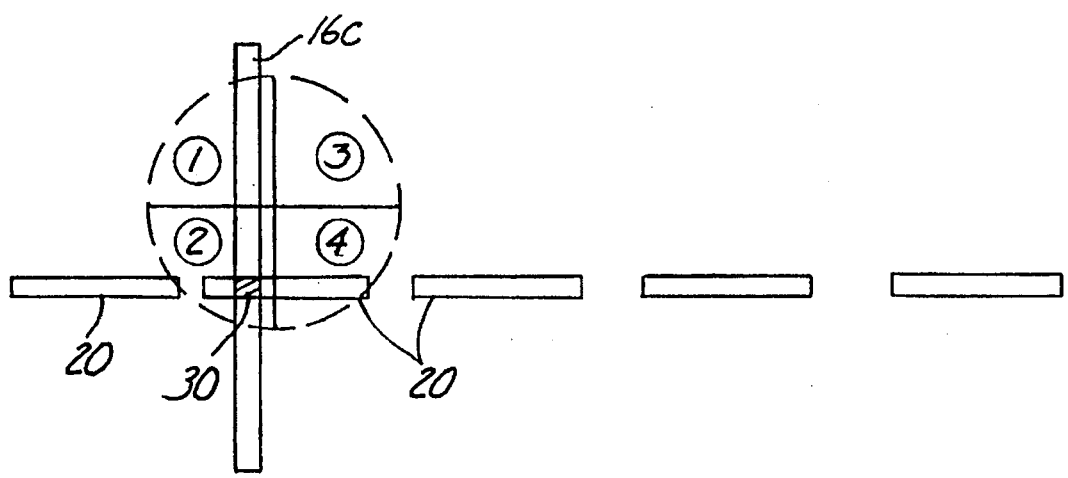
FIG. 4 shows a top view of the fluorescent band of chemicals with respect to the implement and the position-detecting equipment when the implement is off course.

FIG. 4 shows the excited region 30 or the fluorescent chemical band 20 located in quadrant 2 of the area covered by the four-quadrant army detector 14. In this condition, the operator knows that the end of the implement has deviated from course which requires corrective steering to tractor 11 to return the tractor and the implement back on course. While FIG. 3 and FIG. 4 illustrate excitation of the fluorescent band on the field, the actual information on the position of the implement with respect to the field would be displayed on a monitor in front of the tractor driver, so that he or she cold make the necessary corrections without having to follow the end of the boom which can be 60 or more feet to the side of the operator.

Figure 5:
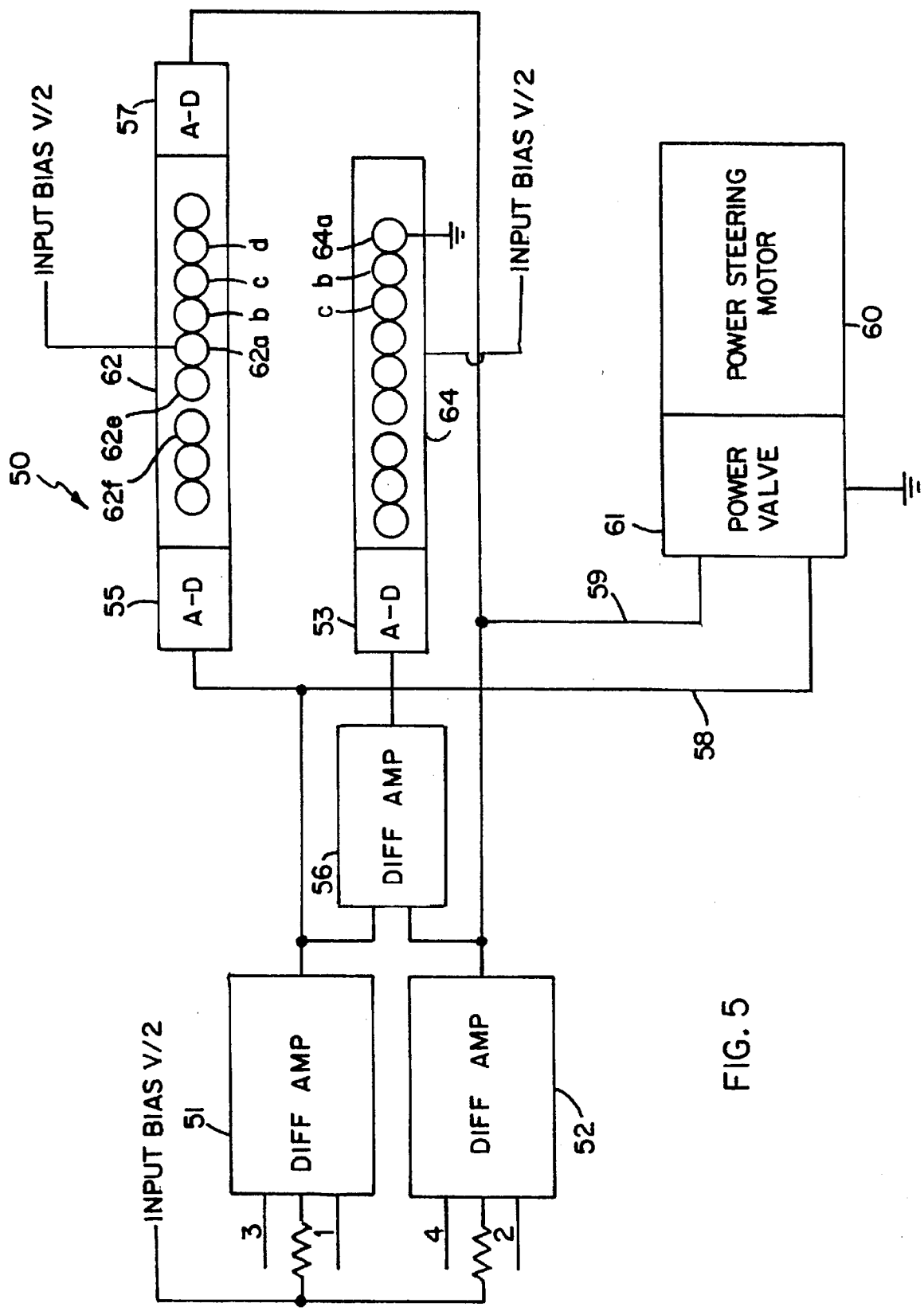
FIG. 5 shows a block diagram of a system for automatically or manually correcting the position of the implement.

FIG. 5 shows a block diagram of a system 50 for providing periodic correction to the steering system of tractor 11. System 50 includes a first difference amplifier 51 which receives electrical signals from quadrants 1 and 3 of the four-quadrant array detector. Similarly, second difference amplifier 52 receives electrical signals from quadrants 2 and 4 of the four-quadrant away detector. In order to work with positive voltages rather than ground reference signal a biasing signal of strength V/2 is fed into difference amplifiers 51 and 52 as well as to LED strips 62 and 64. The difference signal from quadrants 3 and 1 is sent to a difference operational amplifier 51 which supplies a signal to one end of a liner array of light-emitting diodes 62 containing an A-D converter 55. Similarly, the electrical signal from difference amplifier 52 is sent to an analog-to-digital (A/D) coverlet 55 and to the opposite end of the array of light-emitting diodes 62 which contains another A-D converter 57. The middle diode 62a of the light-emitting diode array is at a positive voltage V/2, so that the relative strength of the signals from the difference amplifiers 51 and 52 determine illumination of the diodes. For example, if the fluorescent band and position of the equipment are as shown in FIG. 3, the difference signal between the first and the third quadrant would be zero and the difference signal between the second and the fourth quadrants would be zero. In this condition, diode 62a would be illuminated informing the operator that the implement is on course. On the other hand, if the signals from difference amplifiers 51 and 52 differ from one another, the signal applied to the array of light-emitting diodes 62 would activate diodes 62a, 62b, 62c and 62d, visually indicating to the operator that the tractor has moved off course and away from the marker band of fluorescent chemicals. Conversely, if the electrical signal from difference amplifiers 51 and 52 is such that the lights 62a, 62e and 62f are illuminated, the operator knows the implement is overlapping the previous pass.

A portion of the signal from difference amplifiers 51 and 52 is sent to a difference operational amplifier 56 (first derivative) where from it is sent to an A/D 53 on one end of a second array of light-emitting diodes 64. The signal sent from difference operational amplifier 56 is sent is used to determine the rate of deviation of the vehicle from the proper course. That is, by obtaining the difference signal of the two difference amplifiers, one can use the array of light-emitting diodes 64 to indicate the rate at which the deviation is occurring. For example, diode 64a illuminated indicates that the course is being maintained. If diode lights 64a, 64b and 64c illuminated it indicates that the machine is veering off course rapidly.

The array of light-emitting diodes 62 and 64 are commercially available from the SatLoc Company of Phoenix, Ariz.

System 50 also shows signals from difference amplifiers 51 and 52 being sent through switches 59 and 58 to a power valve 61 which controls a power steering motor 60 for correcting the direction of the vehicle. The purpose of switches 58 and 59 is to disable the correction system as the operator comes to the end of the field and turns the tractor around to make a return pass. Once the tractor and implement are properly aligned, the operator closes switches 58 and 59 to allow the signals from difference amplifiers 51 and 52 to send a corrective signal to power valve 61 which, in turn, controls the power steering motor on the tractor 11 by sending a signal to steer the tractor left or right to maintain the course of the tractor.

We claim:

1. An implement for applying agricultural chemicals over an extended area without producing excessive overlapping or underlapping of agricultural chemicals comprising:

an elongated boom arm for applying the agricultural chemicals proximate the boom arm, said elongated boom arm having a first end and a second end;

a nozzle for directing a band of fluorescent chemical onto a position represented by a path of a first end of the boom arm;

a light source for exciting a portion of the fluorescent chemical band;

a set of difference amplifers for determining the deviation of the implement from a course;

a proportioning valve and a power steering motor with the proportioning valve responsive to the deviation of the implement from the course to thereby send a corrective signal to the power steering motor to bring the implement back on the course;

a four-quadrant photodetector array for determining the position of the illuminated portion of the fluorescent chemical band with respect to the second end of the implement, so that the corrective signal can be sent to bring the implement to the course where the implement does not produce excessive underlapping or overlapping between respective passes of the implement.

2. The implement of claim 1 including a first array of linear diodes responsive to the deviation of the implement from the course.

3. The implement of claim 2 including a second away of linear diodes responsive to the rate of deviation from the course.

4. The implement of claim 3 including a switch for disconnecting the proportioning valve from the power steering motor to enable an operator to manually control the heading of the implement.

5. The implement of claim 1 including a second light source and a second photodetector for determining the position of the illuminated portion of the fluorescent chemical band with respect to the first end of the implement.

* * * * *